(12) United States Patent
Tetrault

(10) Patent No.: US 9,354,306 B1
(45) Date of Patent: May 31, 2016

(54) SINGLE ANTENNA ALTIMETER SYSTEM AND RELATED METHOD

(71) Applicant: Howard D. Tetrault, Melbourne, FL (US)

(72) Inventor: Howard D. Tetrault, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 301 days.

(21) Appl. No.: 13/891,985

(22) Filed: May 10, 2013

(51) Int. Cl.
*G01S 13/34* (2006.01)
*G01S 13/88* (2006.01)
*G01S 13/00* (2006.01)

(52) U.S. Cl.
CPC .............. *G01S 13/882* (2013.01); *G01S 13/34* (2013.01)

(58) Field of Classification Search
CPC ............ G01S 7/02; G01S 7/35; G01S 7/352; G01S 13/02; G01S 13/06; G01S 13/08; G01S 13/32; G01S 13/34; G01S 13/88; G01S 13/882; G01S 13/345
USPC ................. 342/118, 120–122, 128–133, 175, 342/192–197
See application file for complete search history.

(56) References Cited

U.S. PATENT DOCUMENTS

| | | | | |
|---|---|---|---|---|
| 3,065,465 A * | 11/1962 | Wimberly | | 342/122 |
| 3,248,729 A * | 4/1966 | Howard et al. | | 342/128 |
| 3,611,377 A * | 10/1971 | Rittenbach | | 342/128 |
| 3,816,829 A * | 6/1974 | O'Farrell | | 342/132 |
| 3,829,860 A * | 8/1974 | Cutler et al. | | 342/132 |
| 4,008,475 A * | 2/1977 | Johnson | | 342/128 |
| 4,106,020 A * | 8/1978 | Johnson | | 342/128 |
| 4,245,221 A * | 1/1981 | Kipp et al. | | 342/128 |
| 4,306,236 A * | 12/1981 | Johnson | | G01S 13/345 342/128 |
| 4,983,979 A * | 1/1991 | McKenzie | | 342/131 |
| 5,189,427 A * | 2/1993 | Stove et al. | | 342/128 |
| 7,239,266 B2 * | 7/2007 | Vacanti | | 342/120 |
| 7,982,661 B2 * | 7/2011 | Beasley | | 342/128 |
| 8,259,002 B2 * | 9/2012 | Vacanti et al. | | 342/120 |
| 8,537,049 B2 * | 9/2013 | Hase | | 342/128 |
| 8,866,667 B2 * | 10/2014 | Vacanti | | 342/120 |

* cited by examiner

*Primary Examiner* — Bernarr Gregory
(74) *Attorney, Agent, or Firm* — Angel N. Gerdzhikov; Donna P. Suchy; Daniel M. Barbieri

(57) ABSTRACT

A system and related method is disclosed for determining a range between a single antenna array and a radio-frequency reflective surface. The system includes a frequency modulated continuous wave (FMCW) signal generator which transmits the FMCW transmission signal through a pair of bias tees and a coupler prior to reaching a circulator. The circulator selectively routes the transmission signal to the single antenna array for transmission. As the transmission signal is reflected from the RF reflective surface, the single antenna array receives the reflected FMCW reception signal. The coupler receives the reception signal and delays and selectively routes the reception signal to a mixer which mixes the reception signal with a transmission signal input to create a low frequency signal. The low frequency signal passes through the pair of bias tees, is converted to digital, and received by a processor which determines the range to the reflective surface.

20 Claims, 6 Drawing Sheets

| 602 | generating a transmission signal via a frequency modulated continuous wave signal generator |
| --- | --- |
| 604 | selectively routing the transmission signal via a circulator |
| 606 | transmitting the transmission signal via a wireless radio-frequency signal from the single antenna |
| 608 | receiving a wireless radio-frequency reception signal via the single antenna, the reception signal a reflection of the transmission signal, the reflection caused by the radio-frequency reflective surface |
| 610 | selectively routing the reception signal via the circulator, the reception signal isolated from the transmission signal within the circulator by at least 30 dB, the reception signal routed after a delay |
| 612 | mixing the transmission signal with the reception signal to create a low frequency return signal |
| 614 | determining the range between the single antenna and the radio-frequency reflective surface based on the low frequency return signal |
| 616 | presenting the determined range to a user |

FIG. 6

SINGLE ANTENNA ALTIMETER SYSTEM AND RELATED METHOD

FIELD OF THE INVENTION

The present invention relates generally to radio altimetry systems and components thereof. More particularly, embodiments of the present invention relate to a system and method for single antenna transmission and reception of a radio altimetry signal.

BACKGROUND OF THE INVENTION

Traditional radio altimeter systems have been plagued with many limitations. Most significantly, traditional Low Range Altimeter (LRA) installation systems form a closed loop. This close loop is normally formed from transmitting a modulated signal in the 4.3 GHz band on a transmitting antenna and receiving the ground reflected signal via a second receiving antenna. Then, the system mixes the ground reflected signal with the transmitted modulated signal within the receiver to determine the round-trip delay of the signal.

These closed loop systems induce challenges to manufacturers and operators desirous of accurate radio altitude information in a variety of ways. Since each of the signals is vital to proper operation, a high level of isolation is required between the transmit (Tx) antenna and the receive (Rx) antenna. Traditional systems are prone to false altitude detection from leakage (reflections from surrounding vehicle structure between Tx and Rx antenna). Cable routing and shielding is also critical to avoid leakage. This labor intensive routing and shielding requires continuous isolation between coaxial feed lines greater than 120 dB.

Traditional systems further require a calibrated delay for zero feet altitude (defined as the Aircraft Installation Delay (AID)). Specific lengths of coaxial cable must be used to ensure the correct AID. This requires the Line Replaceable Unit (LRU) to be located close to the antenna (approximately 12 to 15 feet).

Consequently, a need remains for an alternative to large form factor radio altimeter systems requiring multiple antennas and labor intensive cable routing and shielding.

SUMMARY OF THE INVENTION

Accordingly, an embodiment of the present invention is directed to a system for determining a range between a single antenna and a radio-frequency reflective surface. The system comprises a single antenna array configured for: receiving and re-transmitting a transmission signal, and receiving and sending a reception signal, a circulator configured for: receiving and sending the transmission signal, receiving and sending the reception signal, and delaying the sending of the reception signal by a delay, a coupler configured for receiving the transmission signal and sending the transmission signal to a mixer and to the circulator, a mixer configured for: receiving the transmission signal from the coupler, receiving the reception signal from the circulator, and mixing the transmission signal and the reception signal to create and send a low frequency return signal to a first bias tee, the first bias tee configured for routing the transmission signal and the reception signal, a second bias tee configured for routing the transmission signal and the low frequency return signal, a frequency modulated continuous wave signal generator configured for generating the transmission signal, a transmitter configured to transmit the transmission signal to the second bias tee, an analog summing unit configured for summing the low frequency return signal and a processor generated signal to create and send a summed signal, a signal processor configured for: receiving the summed signal, adjusting a power output to the single antenna array based on the summed signal, and determining the range between the single antenna array and the radio frequency reflective surface based on the summed signal, a transmission component configured for converting the range to information perceptible by a human, the frequency modulated continuous wave signal generator is configured to generate and send a transmission signal through the transmitter, the bias tees, the coupler and the circulator to the single antenna array, the single antenna array is configured to transmit the transmission signal and receive the reception signal, the antenna patch array is further configured to send the reception signal through the coupler, the mixer and the bias tees to the signal processor for the determining and transmission.

An additional embodiment of the present invention includes a single antenna array configured as a patch array and wherein the single antenna array receives the transmission signal via a hardware link and re-transmits the transmission signal via a wireless radio frequency. Further, the single antenna array may receive the reception signal via a wireless radio frequency and re-transmits the reception signal via a hardware link.

An additional embodiment of the present invention includes a delay of approximately five nanoseconds and the summed signal is converted from analog to digital enroute to the signal processor.

An additional embodiment of the present invention includes a transmission component configured for converting the range to information perceptible by a human further comprises one of: a display, a radio frequency transmitter, an audio alert and a visual alert.

An additional embodiment of the present invention includes a method for determining a range between a single antenna and a radio-frequency reflective surface, comprising generating a transmission signal via a frequency modulated continuous wave signal generator, selectively routing the transmission signal via a circulator, transmitting the transmission signal via a wireless radio-frequency signal from the single antenna, receiving a wireless radio-frequency reception signal via the single antenna, the reception signal a reflection of the transmission signal, the reflection caused by the radio-frequency reflective surface, selectively routing the reception signal via the circulator, the reception signal isolated from the transmission signal within the circulator by at least 30 dB, the reception signal routed after a delay, mixing the transmission signal with the reception signal to create a low frequency return signal, determining the range between the single antenna and the radio-frequency reflective surface based on the low frequency return signal, and presenting the determined range to a user.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is a flow diagram of a method for single antenna radio altimetry exemplary of an embodiment of the present invention.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a small form factor single antenna radio altimeter system configured for accurate radio altimetry measurements between the single antenna and a radar reflective surface. The single antenna transmits and receives RF energy while maintaining a small form factor capable of installation on board a variety of platforms.

Figure 1:
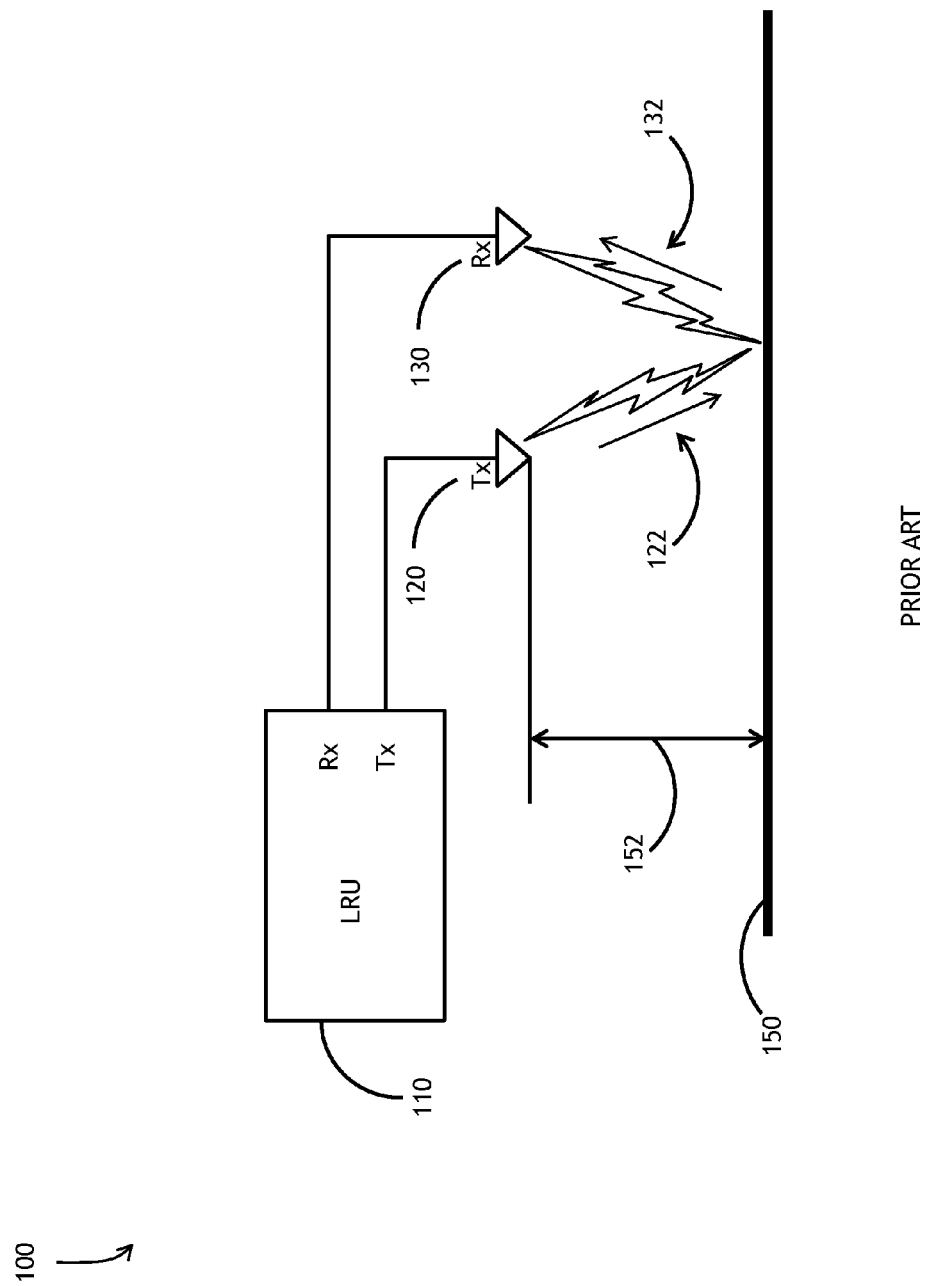
FIG. 1 is a prior art diagram of a traditional radio altimeter system.

Referring to FIG. 1, a prior art diagram of a traditional radio altimeter system is shown. Prior art systems may include a LRU 110 configured to transmit a signal and receive a signal. Transmitting antenna 120 transmits transmission signal 122. RF reflective surface 150 reflects the reception signal 132 received by receiving antenna 130. Traditional LRU may then act to determine a range 152 between the antennas 120, 130 and the reflective surface 150.

Figure 2:
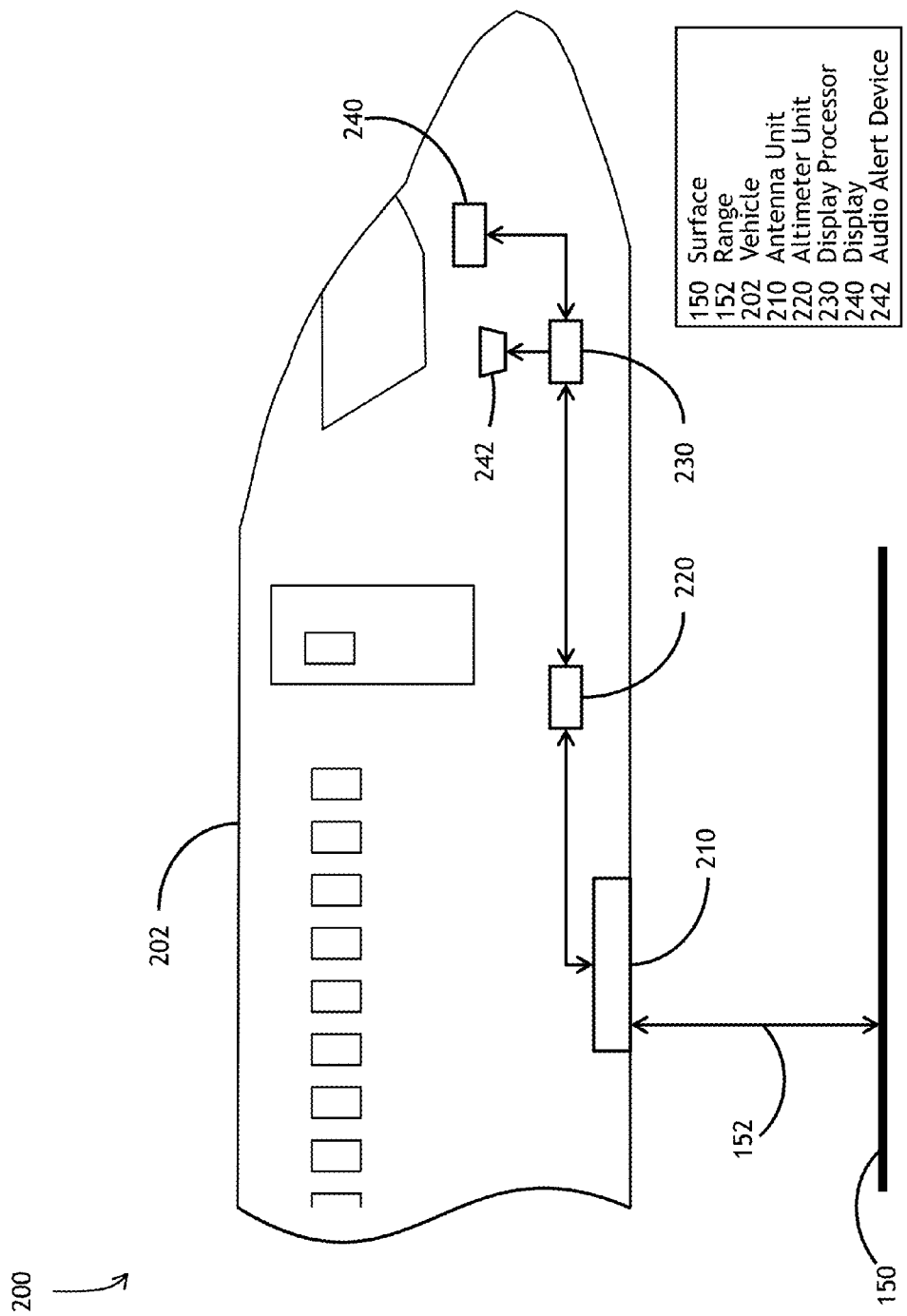
FIG. 2 is a single antenna radio altimeter system as exemplarily mounted on an airplane in accordance with an embodiment of the present invention.

Referring to FIG. 2, a single antenna radio altimeter system as exemplarily mounted on an airplane in accordance with an embodiment of the present invention is shown. Antenna unit 210 may be operationally mounted for unobstructed RF transmission and reception on an external surface of the vehicle 202. Antenna unit 210 functions to transmit and receive RF energy as one of the sub-systems of system 200.

An additional goal of the present invention includes a single small form factor antenna to site on the undercarriage of the aircraft where antenna characteristics may be monitored by monitoring the leakage components. Altimeter unit 220 may be mounted in an operationally convenient location on board vehicle 202. Altimeter unit 220 may also function to house additional sub-systems of the overall system 200.

Display processor 230 may optionally receive signals from the altimeter unit 220 and configure the signals for human perception via a display 240 and an audio alert device 242. In embodiments, display processor 230 may be eliminated from system 200 in favor of a direct link to a communications device or additional systems. It is contemplated herein; single antenna radio altimeter system 200 may receive range information from antenna unit 210 and altimeter unit 220, and transmit the range information to an additional system for further use. For example, a plurality of antennas incorporated within single antenna radio altimeter system 200 may transmit range information from a plurality of bearings to an on board processor to determine a three dimensional distance from a surface 150 or an object.

One goal of the present invention may include a small form factor single antenna unit configurable for the vehicle upon which the antenna is operationally mounted. For example, as mounted on an aircraft, the antenna unit 210 may conform to the contours of the underside of the aircraft creating an operational radio altimeter while maintaining near zero added skin friction drag to the surface of the aircraft. Additionally, as mounted on an automobile, the highly configurable single antenna radio altimeter system 200 may successfully mount in locations of small form factor only accessible by a single antenna or a single communications cable.

Figure 3:
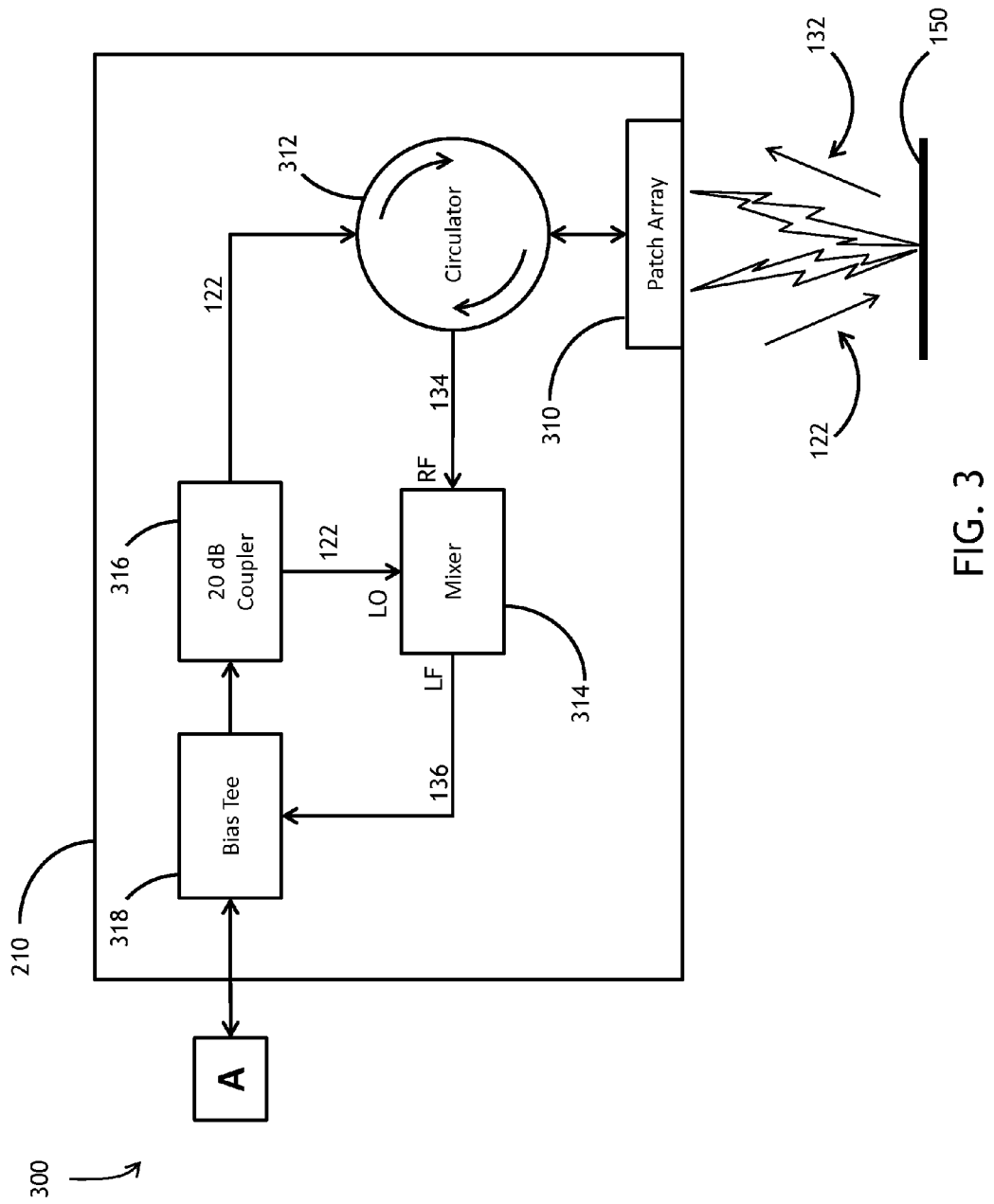
FIG. 3 is a diagram of a single antenna radio altimeter antenna unit exemplary of an embodiment of the present invention.

Referring to FIG. 3, a diagram of a single antenna radio altimeter antenna unit exemplary of an embodiment of the present invention is shown. System 300 may exemplarily include antenna unit 210, within or adjacent to the antenna unit 210 housing is an antenna patch array 310. System 300 further includes an electronic package containing a coupler 316, mixer 314 and circulator 312 to generate the receiver return.

Antenna patch array 310 functions as the transmitter and receiver for RF wireless signals employed by single antenna radio altimeter system 300. Transmission signal 122 is received through bias tee 318 and transmitted to coupler 316. System 300 couples transmission signal 122 to mixer 314 through the LO input and to circulator 312. Coupler 316 may function to tap off a portion of the transmitted FMCW waveform (transmission signal 122) for mixing with the received FMCW waveform (reception signal 132) that is reflected from the surface 150. Circulator 312 is used to separate the transmitted signal (traveling from the coupler 316 to the Patch Array 310) from the return signal (traveling from the Patch Array 310 to the Mixer 314).

In furtherance of the additional goal of the present invention of a constant and deterministic isolation between the reception signal and the transmission signal, circulator 312 functions to selectively route both the transmission signal 122 and the reception signal 132. System 300 additionally employs circulator 312 to provide at least 30 dB of isolation between the transmission signal 122 and the reception signal 132.

When routing the transmission signal 122, circulator 312 receives the transmission signal 122 from the coupler 316 and transmits it to the antenna patch array 310. Antenna patch array 310 functions to both transmit the transmission signal 122 and, as the transmit signal is reflected from RF reflective surface 150, to receive the reception signal 132. Antenna patch array 310 receives the reception signal 132 and transmits it through circulator 312 to the RF input of mixer 314. In one embodiment, a circulator 312 with 40 dB of isolation between a Tx port and a Rx port functions to ensure the mixer 314 is not overloaded.

System 300 may employ a specific transmitter power of +24 dBm coupled to the mixer LO input through a 20 dB coupler. As reception signal 132 is received by antenna patch array 310 and passes through the circulator 312, it is delayed by an exemplary 5 ns delay. The delayed return signal 134 is connected to the RF input of mixer 314.

The exemplary 5 ns delayed transmitter leakage signal will produce a low frequency return signal 136 that is used to adjust for losses in the transmission line between the transceiver within the LRU 220 and the antenna unit 210.

System 300 may cancel the low frequency return signal 136 in software along with all other static leakage signals that result from fixed structures physically near the antenna patch array 310. For example, system 300 compensates for additional antennas, landing gear and flaps on the undercarriage of an aircraft to ensure precise radio altimetry.

A further goal of the present invention includes a low cost, size and weight system where cable length between the LRU and antenna is not critical. It is further contemplated herein; system 300 may function within the scope of the present invention with the antenna patch array 310 sited remotely from the antenna unit 210.

Figure 4:
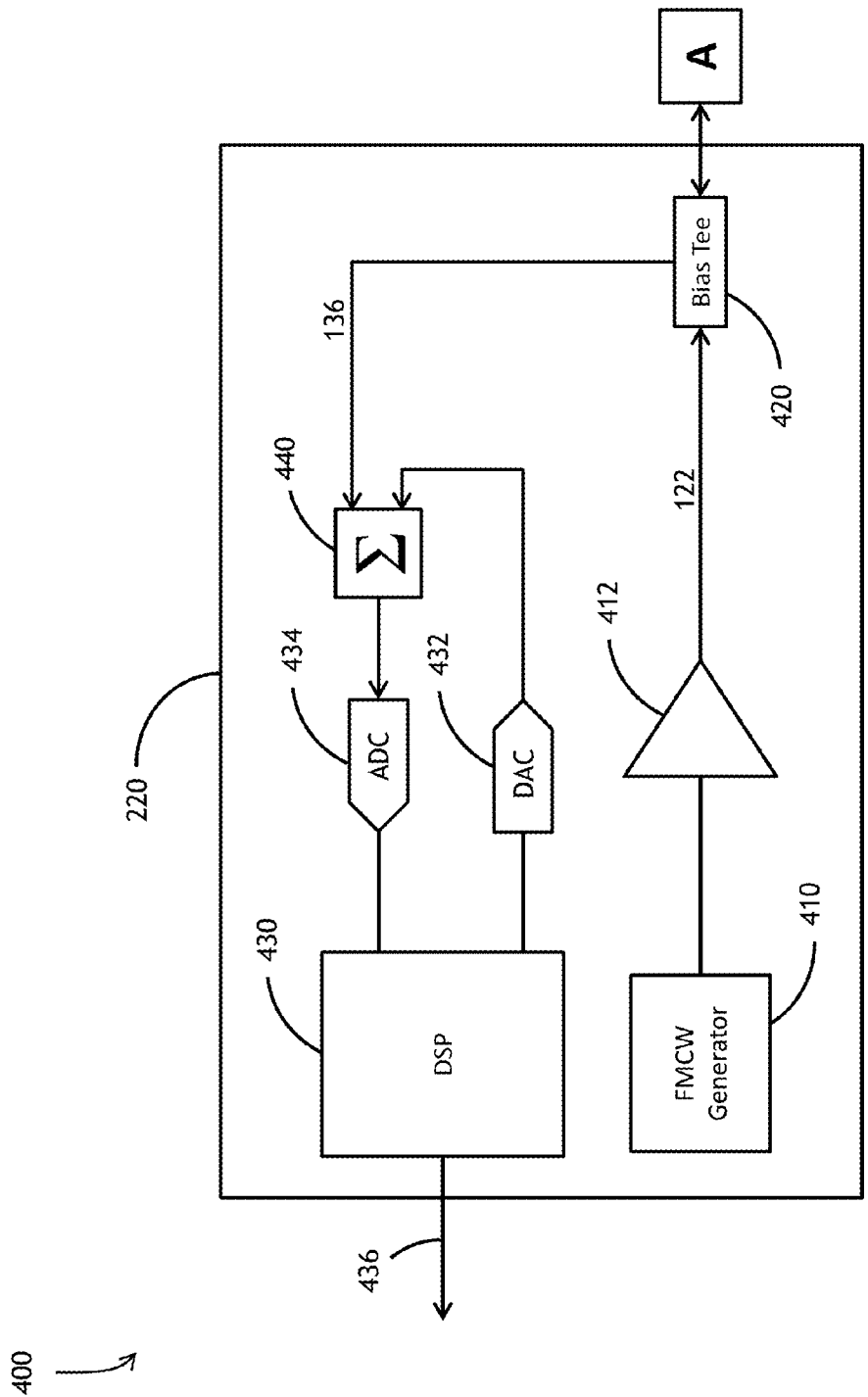
FIG. 4 is a diagram of an altimeter unit of single antenna radio altimeter exemplary of an embodiment of the present invention.

Referring to FIG. 4, a diagram of an altimeter unit of single antenna radio altimeter exemplary of an embodiment of the present invention is shown. System 400 may comprise altimeter unit 220 including associated components for precise radio altimetry. System 400 may be optimally configured for housing with a LRU. Altimeter unit 220 may comprise Frequency Modulated Continuous Wave (FMCW) generator 410, a transmitter 412 and the sampler circuit to digitize the low frequency return signal 136 from the antenna unit 210.

Sampler circuit may include Digital Signal Processor (DSP) 430 configured for processing low frequency return signal 136, once converted. Digital to Analog Converter (DAC) 432 and Analog to Digital Converter (ADC) 434. An analog Summing unit 440 receives analog signals from low frequency return signal 136 from the antenna unit 210 and from an external DAC to aid in canceling out any strong static leakage term from the antenna unit 210. Output 436 from DSP may be specially configured for a variety of potential outputs. It is contemplated herein; outputs may be exemplary configured for a display perceptible by a human, an additional warning sub-system and a transmitter for offboard transmission.

System 400 generates the FMCW RF waveform and outputs it to the antenna unit 210 through the transmission signal 122. System 400 couples the low frequency return signal 136 through the same connector (e.g., coax) and operatively connects each signal and unit through the use of a first low-frequency bias tee 318 and a second low frequency bias tee 420.

System 400 further analyzes the return low frequency return signal 136 and adjusts the power to the antenna unit 210 based on the strength of the leakage return from the circulator 312.

Figure 5:
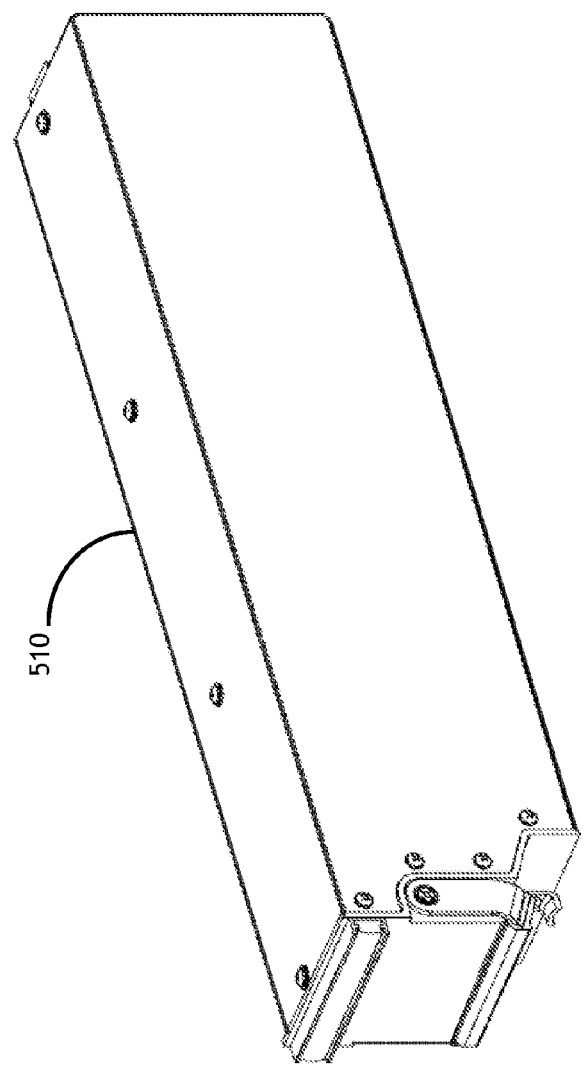
FIG. 5 is a diagram of an avionics housing within which embodiments of the present invention may be configured to conform.

Referring to FIG. 5, a diagram of an avionics housing within which embodiments of the present invention may be configured to conform is shown. One goal of the present invention is a reduction in size, weight, power and cost compared to traditional systems. System 400 may be configured to reside within an existing LRU 510.

Referring to FIG. 6, a flow diagram of a method for single antenna radio altimetry exemplary of an embodiment of the present invention is shown. Method 600 begins at step 602 with generating a transmission signal via a frequency modulated continuous wave signal generator, at step 604, selectively routing the transmission signal via a circulator, and, at step 606, transmitting the transmission signal via a wireless radio-frequency signal from the single antenna. The method continues at step 608 with receiving a wireless radio-frequency reception signal via the single antenna, the reception signal a reflection of the transmission signal, the reflection caused by the radio-frequency reflective surface, and, at step 610, selectively routing the reception signal via the circulator, the reception signal isolated from the transmission signal within the circulator by at least 30 dB, the reception signal routed after a delay, and, at step 612, mixing the transmission signal with the reception signal to create a low frequency signal, and, at step 614, determining the range between the single antenna and the radio-frequency reflective surface based on the low frequency signal, and at step 616, presenting the determined range to a user.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for determining a range between a single antenna and a radio-frequency reflective surface, comprising:
   a single antenna array configured for:
      receiving and re-transmitting a transmission signal; and
      receiving and sending a reception signal;
   a circulator configured for:
      receiving and sending the transmission signal;
      receiving and sending the reception signal; and
      delaying the sending of the reception signal by a delay;
   a coupler configured for receiving the transmission signal and sending the transmission signal to a mixer and to the circulator;
   the mixer configured for:
      receiving the transmission signal from the coupler;
      receiving the reception signal from the circulator; and
      mixing the transmission signal and the reception signal to create and send a low frequency return signal to a first bias tee, the first bias tee configured for routing the transmission signal and the low frequency return signal;
   a second bias tee coupled to the first bias tee configured for routing the transmission signal and the low frequency return signal;
   a frequency modulated continuous wave signal generator configured for generating the transmission signal;
   a transmitter configured to transmit the transmission signal to the second bias tee;
   an analog summing unit configured for summing the low frequency return signal received from the second bias tee and a processor-generated signal to create and send a summed signal;
   a digital signal processor configured for:
      receiving the summed signal;
      adjusting a power output to the single antenna array based on the summed signal; and determining the range between the single antenna array and the radio frequency reflective surface based on the summed signal;

a display processor configured for converting the range to information perceptible by a human;

wherein the frequency modulated continuous wave signal generator is configured to generate and send a transmission signal through the transmitter, the second bias tee, the first bias tee, the coupler and the circulator to the single antenna array, the single antenna array is configured to transmit the transmission signal and receive the reception signal, the single antenna array is further configured to send the reception signal through the coupler, the mixer, the first bias tee and the second bias tee to the signal processor for the determining and transmission.

2. The system for determining a range between a single antenna and a radio-frequency reflective surface of claim 1, wherein the single antenna array is a patch array.

3. The system for determining a range between a single antenna and a radio-frequency reflective surface of claim 1, wherein the single antenna array receives the transmission signal via an antenna unit and re-transmits the transmission signal via a wireless radio frequency.

4. The system for determining a range between a single antenna and a radio-frequency reflective surface of claim 1, wherein the single antenna array receives the reception signal via a wireless radio frequency and sends the reception signal via the antenna unit.

5. The system for determining a range between a single antenna and a radio-frequency reflective surface of claim 1, wherein the delay is approximately five nanoseconds.

6. The system for determining a range between a single antenna and a radio-frequency reflective surface of claim 1, further including an analog to digital converter configured for converting the summed signal from analog to digital enroute to the digital signal processor.

7. The system for determining a range between a single antenna and a radio-frequency reflective surface of claim 1, further including a display, a radio frequency transmitter, an audio alert device and a visual alert depicted on the display.

8. A method for determining a range between a single antenna and a radio-frequency reflective surface, comprising:
generating a transmission signal via a frequency modulated continuous wave signal generator;
selectively routing the transmission signal via a circulator;
transmitting the transmission signal via a wireless radio-frequency signal from the single antenna;
receiving a wireless radio-frequency reception signal via the single antenna, the reception signal a reflection of the transmission signal, the reflection caused by the radio-frequency reflective surface;
delaying the reception signal via the circulator;
selectively routing the reception signal via the circulator, the reception signal isolated from the transmission signal within the circulator by at least 30 dB;
mixing the transmission signal with the reception signal to create a low frequency return signal;
determining the range between the single antenna and the radio-frequency reflective surface based on the low frequency return signal; and
presenting the determined range to a user.

9. The method for determining a range between a single antenna and a radio-frequency reflective surface of claim 8, wherein the single antenna is a patch array antenna.

10. The method for determining a range between a single antenna and a radio-frequency reflective surface of claim 8, wherein the delay of the reception signal is approximately five nanoseconds.

11. The method for determining a range between a single antenna and a radio-frequency reflective surface of claim 8, wherein selectively routing the transmission signal via a circulator further comprises a routing via a second bias tee, a first bias tee and a coupler prior to the transmission signal reaching the circulator.

12. The method for determining a range between a single antenna and a radio-frequency reflective surface of claim 8, wherein the low frequency return signal is summed with a processor-generated signal and converted from analog to digital enroute to the signal processor.

13. The method for determining a range between a single antenna and a radio-frequency reflective surface of claim 8, wherein presenting the determined range to a user further comprises presenting in at least one of: a display, a radio frequency transmitter, an audio alert or a visual alert.

14. A system for determining a range between a single antenna and a radio-frequency reflective surface, comprising:
means for generating a frequency modulated continuous wave transmission signal;
means for selectively routing the frequency modulated continuous wave transmission signal;
means for transmitting the frequency modulated continuous wave transmission signal;
means for receiving a frequency modulated continuous wave reception signal, the frequency modulated continuous wave reception signal a reflection of the frequency modulated continuous wave transmission signal from the radio-frequency reflective surface;
means for isolating, delaying and selectively routing the frequency modulated continuous wave reception signal;
means for mixing the frequency modulated continuous wave transmission signal with the frequency modulated continuous wave reception signal to create a low frequency return signal;
means for determining the range based on the low frequency return signal; and
means for presenting the determined range to a user.

15. The system for determining a range between a single antenna and a radio-frequency reflective surface of claim 14, wherein the means for transmitting and the means for receiving are a single transmitting-receiving means.

16. The system for determining a range between a single antenna and a radio-frequency reflective surface of claim 14, wherein the delay is approximately five nanoseconds.

17. The system for determining a range between a single antenna and a radio-frequency reflective surface of claim 14, wherein the means for selectively routing the frequency modulated continuous wave transmission signal further comprises a bias means and a coupler means for configuring the frequency modulated continuous wave transmission signal.

18. The system for determining a range between a single antenna and a radio-frequency reflective surface of claim 14, wherein the means for selectively routing the frequency modulated continuous wave reception signal further comprises a mixing means and a bias means for configuring the frequency modulated continuous wave reception signal.

19. The system for determining a range between a single antenna and a radio-frequency reflective surface of claim 14, further including a means for summing the low frequency return signal for digitizing the low frequency return signal.

20. The system for determining a range between a single antenna and a radio-frequency reflective surface of claim 14, wherein the means for presenting the determined range to a user further comprises a conversion means for converting the range to one of an audio alert and a visual alert.

\* \* \* \* \*